(12) United States Patent  (10) Patent No.: US 8,554,995 B2
Boerger  (45) Date of Patent: Oct. 8, 2013

(54) CONNECTING A STORAGE SUBSYSTEM AND AN ELECTRONIC DEVICE WITH A CONTROL DEVICE THAT HIDES DETAILS OF THE STORAGE SUBSYSTEM

(75) Inventor: Paul A. Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 12/997,632

(22) PCT Filed: Jul. 29, 2008

(86) PCT No.: PCT/US2008/071417
§ 371 (c)(1),
(2), (4) Date: Dec. 13, 2010

(87) PCT Pub. No.: WO2010/014079
PCT Pub. Date: Feb. 4, 2010

(65) Prior Publication Data
US 2011/0093655 A1  Apr. 21, 2011

(51) Int. Cl.
G06F 12/02 (2006.01)
G06F 13/14 (2006.01)

(52) U.S. Cl.
USPC ..... 711/114; 711/105; 711/302; 711/E12.002

(58) Field of Classification Search
USPC .................. 711/114, 105, 302, E12.002
See application file for complete search history.

(56) References Cited

U.S. PATENT DOCUMENTS 6,230,240 B1 * 5/2001 Shrader et al. ................ 711/114
7,246,192 B1 7/2007 Chang
2007/0022228 A1 1/2007 Hicks et al.
2007/0047537 A1 3/2007 Chen
2007/0294459 A1 12/2007 Chen

FOREIGN PATENT DOCUMENTS

EP 1811396 7/2007
WO WO-2007024740 3/2007

OTHER PUBLICATIONS

EPO, Supplementary European Search Report dated Sep. 30, 2011, App No. 08796748.5 filed Jan. 5, 2011, PCT/US2008071417 filed Jul. 29, 2008.
HP Technology Brief, 2nd edition, Serial ATA Technology, Aug. 2007 (10 pages).
Serial ATA—A Comparison with Ultra ATA Technology, Feb. 2008 (7 pages).
Silicon Image, External Serial ATA, White Paper, Sep. 2004 (16 pages).
The Silicon Image, SteelVine Storage Architecture, The Storage Solution for the 21st Century, Feb. 2008 (7 pages).

* cited by examiner

Primary Examiner — Mardochee Chery

(57) ABSTRACT

An apparatus includes an external interface port to connect to an external electronic device, where the external interface port is to communicate over a communications path with the external electronic device according to a serial communication protocol. The apparatus has a control device to hide details of the storage subsystem from the external electronic device. The control device is configured to perform at least one of (1) expanding a storage capacity of at least one logical storage volume of the storage subsystem, and (2) migrating a portion of data stored in the storage subsystem to a new physical storage device.

13 Claims, 4 Drawing Sheets

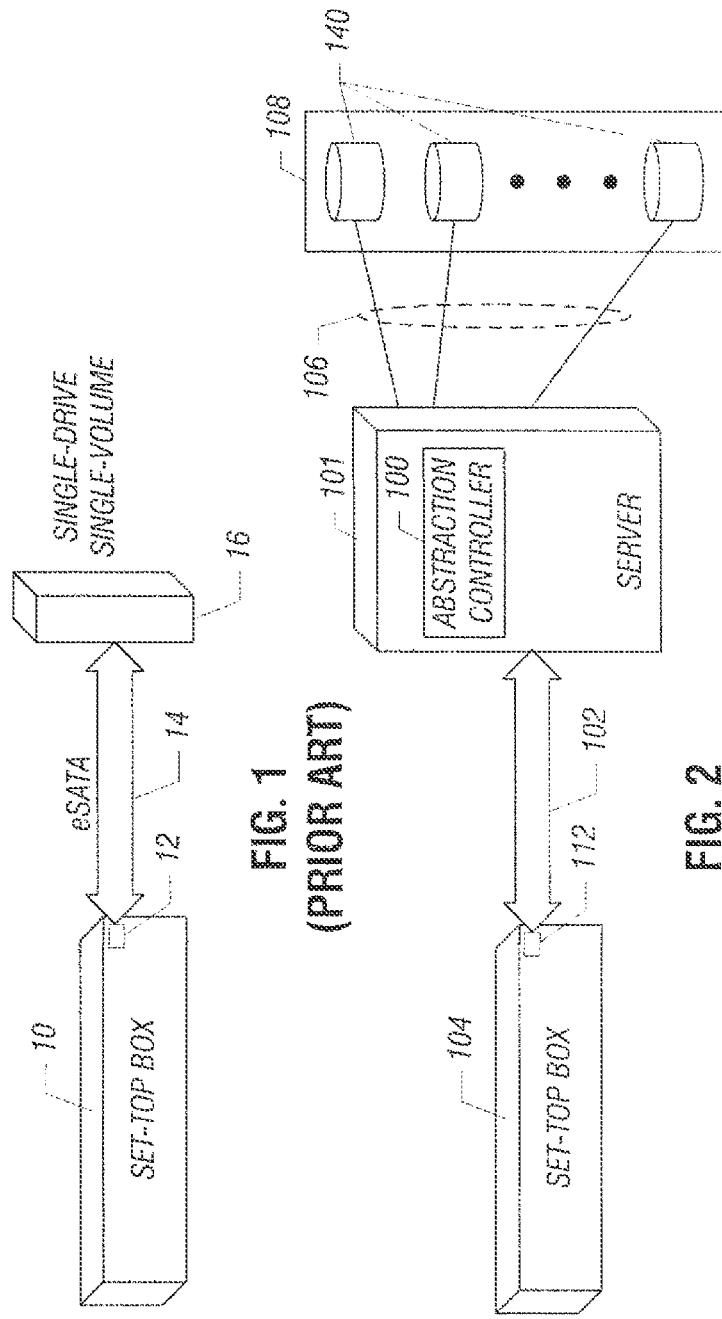

CONNECTING A STORAGE SUBSYSTEM AND AN ELECTRONIC DEVICE WITH A CONTROL DEVICE THAT HIDES DETAILS OF THE STORAGE SUBSYSTEM

BACKGROUND

Set-top boxes or other electronic devices can have external storage connection ports to enable the set-top boxes to connect to an external storage device. Some set-top boxes have the capability to record video programming. Providing external storage connection ports on set-top boxes allows the storage capacity of the set-top boxes to be easily expanded. Adding storage capacity to set-top boxes is desirable because recorded video programming tends to consume relatively large amounts of storage capacity. One exemplary type of a storage connection interface to enable a set-top box to connect to an external storage device is according to an external Serial Advanced Technology Attachment (eSATA) protocol, which defines a communications path for transferring data between a host and a storage device. FIG. 1 shows an exemplary arrangement that includes a set-top box 10 that has an eSATA port 12 to communicate over an eSATA link 14 with an external storage device 16 (e.g., external hard drive).

An issue associated with conventional eSATA connection ports, such as the eSATA connection port 12 of FIG. 1, is that they are able to recognize just single-drive, single-volume storage devices. A single-drive, single-volume storage device is a storage device that has a single storage drive (e.g., hard disk drive) and that has a single volume defined on such drive. A volume is a logical partition of a storage device. Flexibility is reduced when such an external storage connection port is used since the electronic device would not be able to function properly with a storage device that has multiple drives or that has multiple volumes.

BRIEF DESCRIPTION OF THE DRAWINGS

Some embodiments of the invention are described, by way of example, with respect to the following figures:

FIG. 1 is a schematic diagram of a conventional arrangement of a set-top box and external storage device;

FIG. 2 is a schematic diagram of an exemplary arrangement of a set-top box, a storage subsystem, and a server with an abstraction controller according to an embodiment;

DETAILED DESCRIPTION

Figure 3:
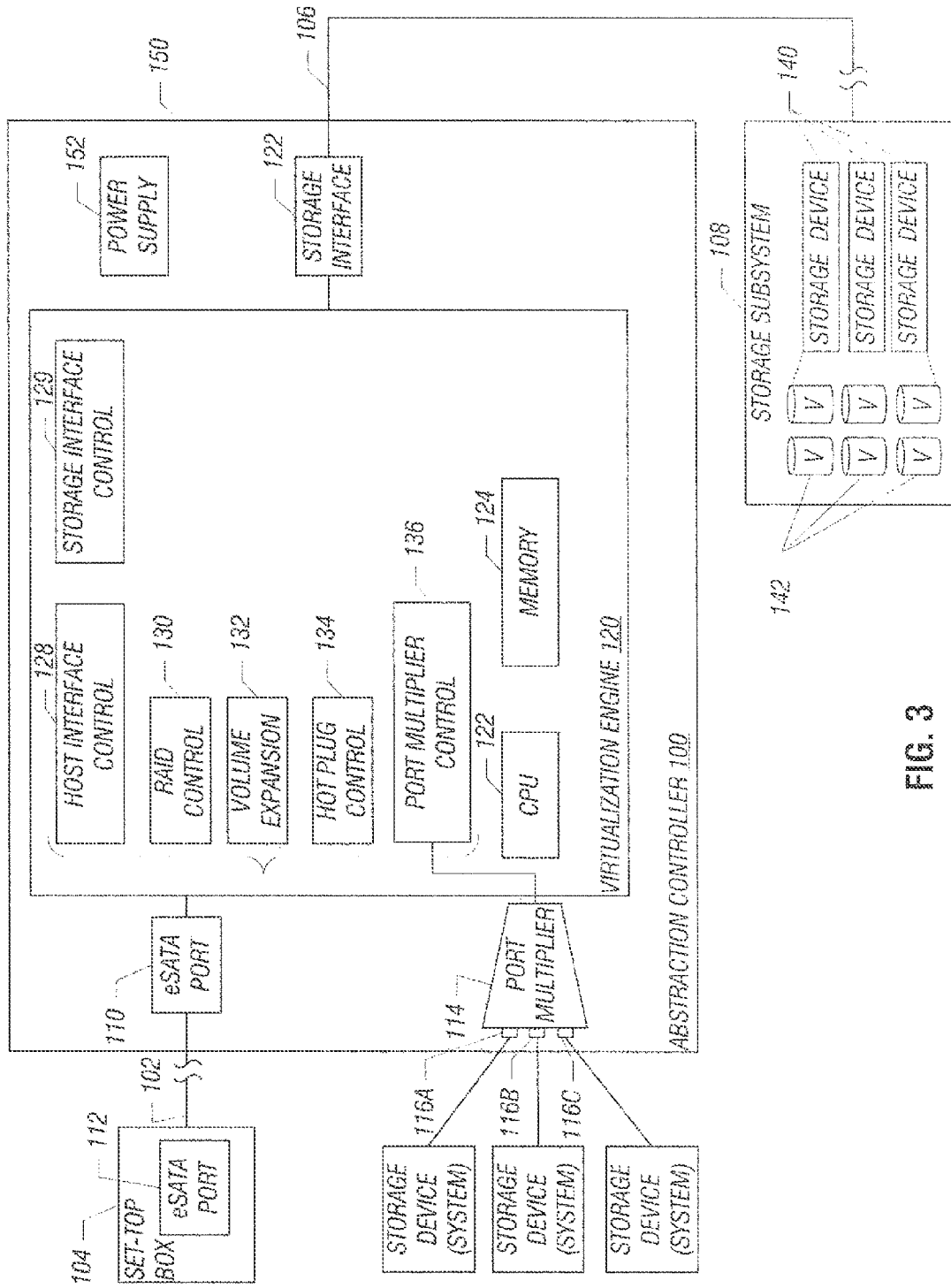
FIG. 3 is a block diagram of the arrangement of FIG. 2 with additional details of the abstraction controller and a storage subsystem, according to an embodiment.

According to some embodiments, an abstraction controller is provided between an electronic device (e.g., a set-top box, a computer, a gaming console, etc.), and a storage subsystem that includes multiple physical storage devices as well as multiple logical storage volumes. The electronic device is able to submit requests to the storage subsystem for performing read and write accesses. A "logical storage volume" refers to some logical partition of the physical storage infrastructure, formed of the physical storage devices, in the storage subsystem. A logical storage volume can be implemented across multiple physical storage devices.

The abstraction controller performs abstracting of the storage subsystem, where abstracting refers to hiding or masking details associated with the storage subsystem from the electronic device. For example, the storage subsystem can implement a relatively high performance RAID (Redundant Arrays of Inexpensive Disks) architecture, such as a RAID 5 or RAID 6 architecture. RAID 5 or RAID 6 provides for robust protection against failure of physical storage devices, such as disk drives, in the storage subsystem. By using the abstraction controller to hide details associated with the RAID architecture from an electronic device, the electronic device does not have to be configured to handle the details associated with the storage system, which simplifies design of the electronic device.

The abstraction controller also enables scalability such that storage capacity of the storage subsystem can be easily expanded (e.g., by adding physical storage devices or expanding the size of at least one of the logical storage volumes of the storage subsystem).

The abstraction controller according to some embodiments also provides for port multiplier control. The port multiplier control allows an external Serial Advanced Technology Attachment (eSATA) port multiplier to be connected to, or be a part of, the abstraction controller. An eSATA port multiplier is a unidirectional splitting device to allow one eSATA port to connect to multiple storage subsystems (or devices) that are connected to corresponding ports of the port multiplier. More generally, a port expander can be used instead, where a port expander is a device to expand a single port to multiple ports to allow multiple devices to be connected to the single port. In the ensuing discussion, although reference is made to "port multiplier," note that the described techniques or mechanisms can also be applied to other types of port expanders, such as hubs, switches, and so forth.

By using the abstraction controller according to some embodiments, functionalities within the electronic device would not have to be changed to accommodate a relatively complex or high performance storage subsystem. This is particularly beneficial when the electronic device is a relatively low cost device, such as a set-top box (that connects to a television or other external source of audio/video signaling), a gaming console, or any other electronic device that has a reduced capability external storage connection interface. A reduced capability external storage connection interface of an electronic device does not allow the electronic device to be connected to a relatively complex storage subsystem, such as a storage subsystem that provides multiple storage devices and/or multiple logical storage volumes.

FIG. 2 illustrates an exemplary arrangement that includes a set-top box 104 having a port 112 for connection over a first communications path 102 to a server 101, which in turn is connected over a second communications path 106 to a storage subsystem 108 that includes storage devices 140. A communications path can include an electrical cable, a wireless connection, or a combination of the electrical cable and wireless connection. Although reference is made to a "set-top box" in the ensuing discussion, it is noted that mechanisms according to some embodiments can also be applied to other types of electronic devices.

The server 101 includes an abstraction controller 100 that includes capabilities according to some embodiments. As further depicted in FIG. 3, the abstraction controller 100 has an external Serial Advanced Technology Attachment (eSATA) port 110 for communication with a corresponding eSATA port 112 in the set-top box 104. The eSATA port is one example of an external interface port from the abstraction controller 100 to an electronic device. Communication of control messaging and data over the first communications path 102 is according to the eSATA protocol, according to some embodiments. Alternatively, instead of using an eSATA protocol to communicate over the communications path 102 between the set-top box 104 and the abstraction controller 100, a different serial communication protocol can be used instead. A "serial communication protocol" refers to any communication protocol in which data or control messaging is exchanged between two end points over a communication path as a serial stream in each direction between the set-top box 104 and the abstraction controller 100.

The abstraction controller 100 also has a storage interface 112 to communicate over the second communications path 106 with the storage subsystem 108. Instead of being connected to a separate storage interface 112, note that the storage subsystem 108 can be alternatively connected to a port of a port multiplier 114 that is associated with the abstraction controller 100. The port multiplier 114 has multiple ports 116A, 116B, 116C, and so forth. The port multiplier 114 can be part of the abstraction controller 100, or can be external to the abstraction controller 100 but connected to the abstraction controller 100.

The storage subsystem 108 includes physical storage devices 140, as well as logical storage volumes 142 contained in the physical storage devices 140.

The abstraction controller 100 also includes a virtualization engine 120 that provides the abstraction of the storage subsystem 108 for the set-top box 104. The virtualization engine 120 can be implemented as an embedded system that includes a central processing unit (CPU) 122, memory 124, and software 126 executable on the CPU 122. Alternatively, the virtualization engine 120 can be implemented as an integrated circuit chip, such as an application specific integrated circuit (ASIC), a programmable gate array (PGA), and so forth. Generally, a virtualization engine refers to a control device that is able to perform abstraction of a storage subsystem (e.g., storage subsystem 108). In some embodiments, tasks performed by the virtualization engine 120 include: (1) RAID control for controlling a RAID storage subsystem, (2) expansion of volumes of the storage subsystem, (3) control of a port multiplier, and other tasks. The ability to perform the above tasks enables the virtualization engine 120 to hide the details of the storage subsystem 108.

The memory 124 can provide caching and/or buffering. For example, data retrieved from the storage subsystem 108 can be cached in the memory 124 such that future requests for such data can be satisfied from the cache for improved performance. The memory 124 can also buffer commands received from the set-up box 104.

The software 126 of the virtualization engine 120 includes a host interface control module 128 that communicates with the set-top box 104. The host interface control module 128 is able to recognize commands issued by the set-top box 104 and received over the communications path 102 and through the eSATA port 110. The host interface control module 128 is also able to send data (responsive to commands from the set-top box 104) retrieved from the storage subsystem 108 to the set-top box 104. The host interface control module 128 of the virtualization engine 120 is designed to work with existing command/data protocols associated with the set-top box 104, such that the set-top box 104 would not have to be modified to use the storage subsystem 108.

The host interface control module 128 cooperates with a storage interface control module 129 to map commands from the set-top box 104 to commands to the storage subsystem 108. The mapping is specific to the type of set-top box 104 used and the type of storage subsystem 108 used. The mapping, along with other tasks of the virtualization engine 120, performed in the virtualization engine allow complexities of the storage subsystem 108 to be hidden from the set-top box 104.

The virtualization engine 120 also includes a RAID control module 130 that performs various RAID tasks with respect to the storage subsystem 108. RAID tasks include: (1) error detection and correction; (2) RAID rebuild of content of a physical storage device 140 in response to failure of the physical storage device, where rebuilding of the data is performed after a failed physical storage device has been replaced with a functional physical storage device; (3) RAID recovery, in which data that has been lost (such as due to accidental deletion, media corruption, etc.) is recovered; (4) RAID migration, in which a portion of data stored in existing physical storage devices of the storage subsystem is migrated to a new physical storage device that has been added to the storage subsystem 108 (which can occur in the context of migrating from one RAID level to another RAID level); and other tasks.

As one example, RAID level migration involves migrating from RAID 1 to RAID 5. A RAID 1 configuration provides a mirrored set without parity, in which two groups of physical storage devices are provided where one of the groups of physical storage devices is used to mirror (replicate) the other group of physical storage devices. The RAID 5 configuration provides a striped set with distributed parity, which includes at least three groups (up to five groups) of physical storage devices. RAID 5 is tolerant to failure of one of the groups of physical storage devices. Migrating from a RAID 1 level to a RAID 5 level would involve adding additional physical storage devices to enable RAID 5 implementation.

The virtualization engine 120 also includes a volume expansion module 132 to enable any one or more of logical storage volumes 142 in the storage subsystem 108 to be expanded in storage capacity. For example, if it is determined that larger logical storage volumes would provide more efficient or enhanced operation of the storage subsystem 108, then the volume expansion module 132 can redefine the size of each of the logical storage volumes to a larger size. The larger size of each logical storage volume can be specified by a user, or alternatively, can be automatically determined by the volume expansion module 132. Note that the volume expansion module 132 is also able to shrink the size of the logical storage volumes.

The virtualization engine 120 also includes a hot plug control module 134 to control hot plugging of physical storage devices of the storage subsystem 108. Hot plugging a physical storage device refers to either hot adding a physical storage device, or hot removing a physical storage device, or both. Hot adding, or hot removing, a physical storage device refers to inserting, or removing, a physical storage device while the storage subsystem 108 remains live and operational. The hot plug control module 134 is able to receive indications of a hot plug event (a physical storage device being removed or added), and the hot plug control module 134 can perform tasks in response to the hot plug event (e.g., configuring a newly added physical storage device, managing the removal of a physical storage device, etc.).

The virtualization engine 120 also includes a port multiplier control module 136, which is connected to the port multiplier 114. The port multiplier control module 136 is able to recognize multiple storage devices (or subsystems) connected to the multiple ports 116A, 116C of the port multiplier 114.

The abstraction controller 100 according to some embodiments is a separate entity from the set-top box 104. The abstraction controller 100 can have its own enclosure 150 (generally indicated by the outer boundary in FIG. 3) that contains the various components of the abstraction controller 100. The abstraction controller 100 also has a power supply 152 to provide power to the other components of the abstraction controller 100. In addition, the abstraction controller 100 can include various indicators, buttons, and other components (not shown).

Figure 4:
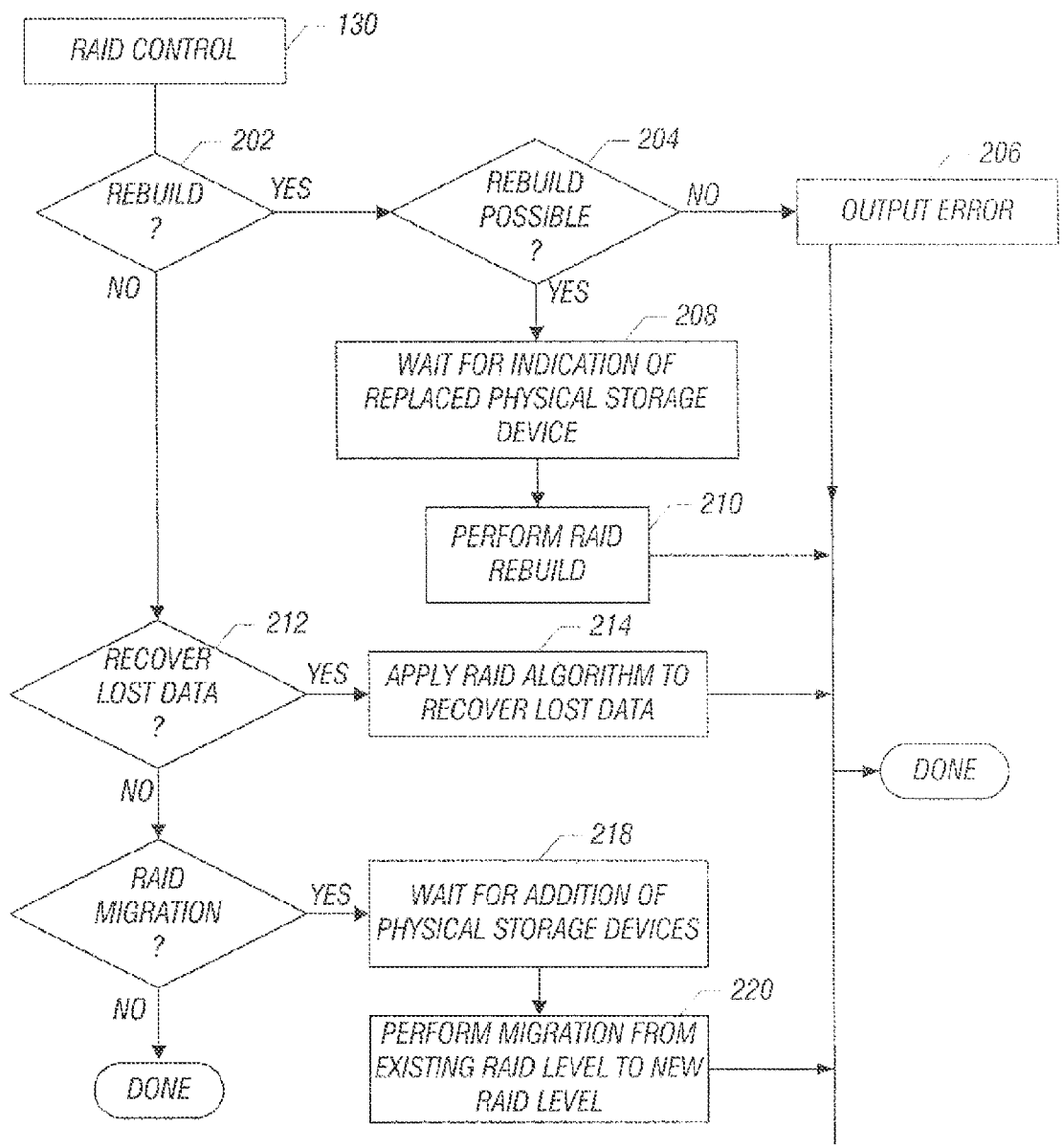
FIG. 4 is a flow diagram of a process of RAID (Redundant Arrays of Inexpensive Disks) tasks performed by the abstraction controller according to an embodiment.

FIG. 4 illustrates some of the tasks that can be performed by the RAID control module 130 of FIG. 3. The RAID control module 130 can perform the tasks indicated in FIG. 4 in response to requests from a user, or alternatively, the RAID control module 130 can perform the tasks automatically based on detected events.

The control module 130 determines (at 202) if rebuilding of a physical storage device content is to be performed. This can be caused by a detection that a physical storage device has failed. In such a scenario, a user can make a request to rebuild the content of the failed physical storage device. If the RAID control module 130 detects that rebuilding of a physical storage device content is desired, then the RAID control module 130 next determines (at 204) if rebuilding is possible. Depending on the RAID level employed, rebuilding may not be possible if more than some number of physical storage devices has failed. If rebuilding is not possible, then the RAID control module 130 outputs (at 206) an error indication.

However, if rebuilding is possible, then the RAID control module 130 waits (at 208) for an indication that the failed physical storage device has been replaced. This may be accomplished by a user removing the failed physical storage device and inserting a new physical storage device. The failed physical storage device can be hot removed, and the new physical storage device can be hot added, under control of the hot plug control module 134 (FIG. 3). Once an indication that the physical storage device has been replaced is received, the RAID control module 130 performs the RAID rebuild (at 210).

Alternatively, if rebuilding of physical storage device content is not requested, the RAID control module 130 can determine (at 212) whether it is desired to recover lost data. Data may have been lost due to accidental deletion, corruption of storage media, and so forth. If recovery of lost data is requested, then the RAID control module 130 applies (at 214) the corresponding RAID algorithm to recover the lost data.

The RAID control module 130 can also detect (at 216) that RAID migration is desired. RAID migration refers to migrating from one RAID level to another RAID level (e.g., from RAID 1 to RAID 5).

Assuming that the migration is from a lower RAID level to a higher RAID level, the RAID control module 130 waits (at 218) for addition of physical storage device(s). Again, the addition of physical storage device(s) can be a hot addition. Once the additional physical storage device(s) has (have) been added, the RAID control module 130 can perform (at 220) migration of the existing RAID level to the new RAID level.

Alternatively, RAID migration can refer to migration from a higher RAID level (e.g., RAID 5) to a lower RAID level (e.g., RAID 1).

Figure 5:
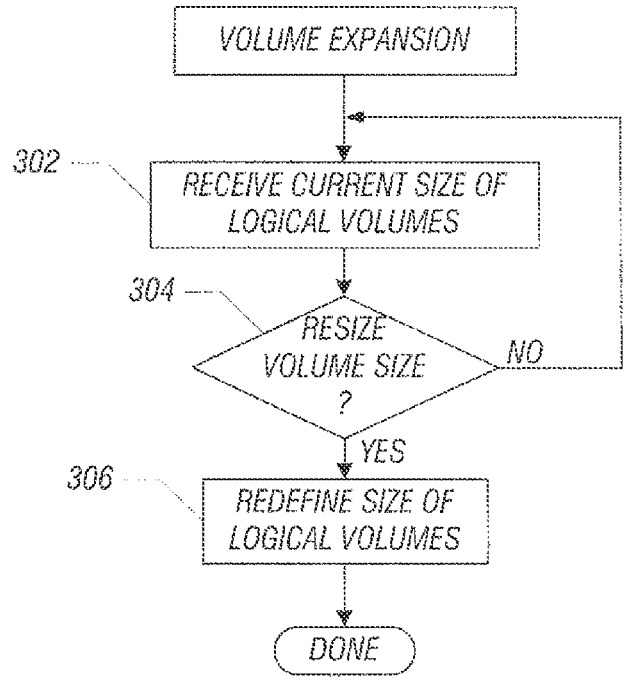
FIG. 5 is a flow diagram of a process of volume expansion performed by the abstraction controller according to an embodiment.

FIG. 5 illustrates a process for expanding logical storage volumes 142 (FIG. 3) as performed by the volume expansion module 132 of FIG. 3, according to an embodiment. The volume expansion module 132 receives (at 302) a current size of the logical storage volumes 142. Next, the volume expansion module 132 determines (at 304) whether resizing of the logical storage volumes 142 is desired. For example, the user may have manually changed a setting to specify larger logical storage volumes. Alternatively, the system may have detected that larger or smaller logical storage volumes would improve system performance. In response to determining that resizing of logical storage volumes is desired, the volume expansion module 132 redefines (at 306) the size of the logical storage volumes 142.

Figure 6:
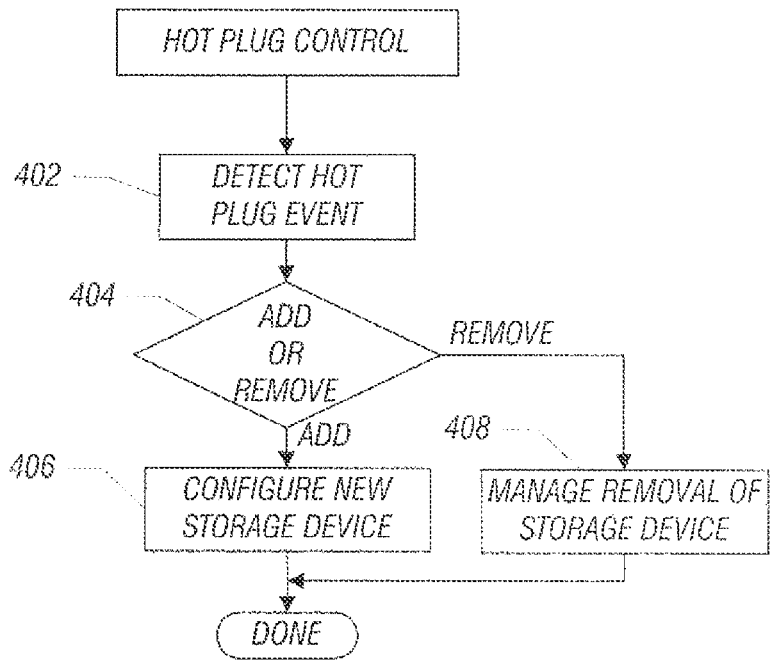
FIG. 6 is a flow diagram of a process of hot plug control performed by the abstraction controller according to an embodiment.

FIG. 6 illustrates a process for performing hot plug control as performed by the hot plug control module 134 of FIG. 3. The hot plug control module 134 detects (at 402) a hot plug event (e.g., indicated by an interrupt caused by hot adding or hot removing a physical storage device). In response to the hot plug event, the hot plug control module 134 determines (at 404) whether a physical storage device has been hot added or hot removed. If a physical storage device has been hot added, the hot plug control module 134 configures (at 406) the added physical storage device. However, if the physical storage device has been hot removed, then the hot plug control module 134 manages (at 408) the removal of the physical storage device, such as providing an indication of the removal to operating system software.

Instructions of software described above (including software 126 of FIG. 3) are loaded for execution on a processor (such as CPU 122 in FIG. 3). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus comprising:
an external interface port to connect to an external electronic device, the external interface port to communicate over a communications path with the external electronic device according to a serial communication protocol;
a storage interface port to connect to a storage subsystem having a plurality of logical storage volumes; and
a control device to hide details of the storage subsystem from the external electronic device, the control device configured to:
expand a storage capacity of at least one of the logical storage volumes,
receive a request to migrate a RAID (Redundant Arrays of Inexpensive Disks) level of the storage subsystem from a first RAID level to a second, different RAID level,
in response to receiving the request, wait for hot addition of at least one physical storage device to the storage subsystem;
in response to detecting the hot addition of the at least one physical storage device, configure the hot-added at least one physical storage device, and
after configuring the hot-added at least one physical storage device, migrate data stored in the storage subsystem that includes the hot-added at least one physical storage device from the first RAID level to the second RAID level.

2. The apparatus of claim 1, wherein the serial communication protocol comprises an external Serial Advanced Technology Attachment (eSATA) protocol.

3. The apparatus of claim 2, wherein the external interface port is to communicate according to the eSATA protocol with a set-top box, the electronic device being the set-top box.

4. The apparatus of claim 1, wherein the control device is configured to further perform one or more of RAID recovery in response to lost data in the storage subsystem, and RAID rebuilding in response to failure of a portion of the storage subsystem.

5. The apparatus of claim 1, further comprising a port expander having a plurality of ports, wherein the control device is configured to provide control for the port expander.

6. The apparatus of claim 1, further comprising a housing, wherein the external interface port, storage interface port, and control device are contained in the housing.

7. A method of abstracting a storage subsystem to an electronic device, comprising:
providing an abstraction controller separate from the electronic device, the abstraction controller having an external interface port for connection to the electronic device and a storage interface port for connection to a storage subsystem;
communicating between the abstraction controller and the electronic device according to a serial communication protocol; and
performing, by the abstraction controller:
expanding a storage capacity of at least one logical storage volume in the storage subsystem;
receiving a request to migrate a RAID (Redundant Arrays of Inexpensive Disks) level of the storage subsystem from a first RAID level to a second, different RAID level;
in response to receiving the request, waiting for hot addition of at least one physical storage device to the storage subsystem;
in response to detecting the hot addition of the at least one physical storage device, configuring the hot-added at least one physical storage device; and
after configuring the hot-added at least one physical storage device, migrating data of the storage subsystem including the hot-added at least one physical storage device from the first RAID level to the second RAID level.

8. The method of claim 7, wherein communicating between the abstract controller and the electronic device according to the serial communication protocol comprises communicating according to an external Serial Advanced Technology Attachment (eSATA) protocol.

9. The method of claim 7, further comprising performing, by the abstraction controller, rebuilding of lost data in the storage subsystem using a RAID algorithm.

10. A system comprising:
an electronic device having an interface port;
a controller having an interface port to communicate with the electronic device according to a serial communications protocol; and
a storage subsystem connected to the controller,
wherein the controller is configured to hide details of the storage subsystem from the electronic device, the controller configured to:
receive a request to perform RAID (Redundant Arrays of Inexpensive Disks) migration from a first RAID level to a second, different RAID level in the storage subsystem;
in response to receiving the request, wait for hot addition of at least one physical storage device to the storage subsystem;
in response to detecting the hot addition of the at least one physical storage device, configure the hot-added at least one physical storage device; and
after configuring the hot-added at least one physical storage device, perform RAID migration of data in the storage subsystem including the hot-added at least one physical storage device from the first RAID level to the second RAID level.

11. The system of claim 10, wherein the storage subsystem has multiple physical storage devices and multiple logical storage volumes, wherein the electronic device and the controller are configured to communicate according to an external Serial Advanced Technology Attachment (eSATA) protocol, and wherein the interface port of the electronic device is unable to recognize multiple physical storage devices and multiple logical storage volumes.

12. The system of claim 10, wherein the controller is configured to further expand a storage capacity of a logical storage volume of the storage subsystem.

13. The system of claim 12, wherein the controller is configured to further perform:
RAID recovery in response to lost data in the storage subsystem, and
RAID rebuilding in response to failure of a portion of the storage subsystem.

* * * * *